United States Patent Office 3,349,105
Patented Oct. 24, 1967

3,349,105
ω-CYANOPERFLUOROALKANOYL CHLORIDES
Carl J. Verbanic, Louisville, Ky., assignor to Hooker Chemical Corporation, Niagara Falls, N.Y., a corporation of New York
No Drawing. Filed Aug. 18, 1966, Ser. No. 573,195
4 Claims. (Cl. 260—404)

ABSTRACT OF THE DISCLOSURE

ω-Cyanoperfluoroalkanoyl chlorides of the formula

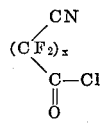

wherein $x$ is from 1 to 12 are formed when perfluorinated amides of the formula

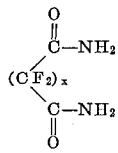

are reacted with a compound selected from the group consisting of

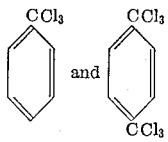

in the presence of a Lewis acid catalyst, where $x$ is as defined above. These new compositions are important intermediates in the preparation of perfluorinated diamidine elastomers as well as other useful plastics.

---

This is a continuation-in-part of United States Ser. No. 811,813, filed May 8, 1959, now abandoned, and Ser. No. 288,464, filed June 17, 1963, now U.S. 3,274,229.

This invention relates to new compositions of matter classified as ω-cyanoperfluoroalkanoyl chlorides. These compositions are simultaneously prepared when perfluorinated amides, such as perfluoroglutaramide, perfluorosuccinoamide and perfluoroadipoamide, are dehydrated to perfluoroglutaronitrile, perfluorosuccinonitrile and perfluoroadiponitrile, in accordance with the teaching of S. N. 288,464.

In accordance with the present invention, ω-cyanoperfluoroalkanoyl chlorides of formula

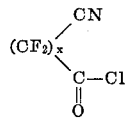

wherein $x$ is from 1 to 12 are formed when perfluorinated amides of the formula

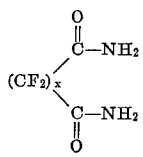

are reacted with a compound selected from the group consisting of

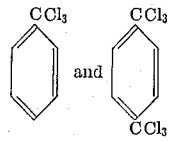

in the presence of a Lewis acid catalyst, where $x$ is as defined above. A more preferred range for $x$ is from 2 to 4.

Compounds embraced by this invention are:
α-cyanodifluoroacetyl chloride,
ω-cyanotetrafluoropropionyl chloride,
ω-cyanohexafluorobutyrl chloride,
ω-cyanooctafluorovaleroyl chloride,
ω-cyanodecafluorohexanoyl chloride,
ω-cyanododecafluoroheptanoyl chloride,
ω-cyanotetradecafluorooctanoyl chloride,
ω-cyanohexadecafluorononanoyl chloride,
ω-cyanooctadecafluorodecanoyl chloride,
ω-cyanoeicosafluoroundecanoyl chloride, and
ω-cyanodocosafluorolauroyl chloride.

By this process, at the same time the corresponding dinitrile is also prepared, which under some conditions yields greater than 55 percent of the theoretical even without sophisticated equipment and reaction modifications. This is illustrated in Examples 1–10 below, wherein temperatures are in degrees centigrade and parts are by weight.

Example 1

25 grams (0.105 mole) of perfluoroglutaramide were added to 61 grams (0.312 mole) of benzotrichloride and 0.8 gram of zinc chloride (1 weight percent). The mixture was heated to 180 degrees centigrade. The nitrile was collected in a Dry-Ice trap. After warming to room temperature to boil off the HCl gas, the residue was distilled to give a product having a boiling point of 38 degrees centigrade. Infrared analysis showed the presence of the C≡N bond and no C=O bond.

The equation for the reaction of Example 1 is:

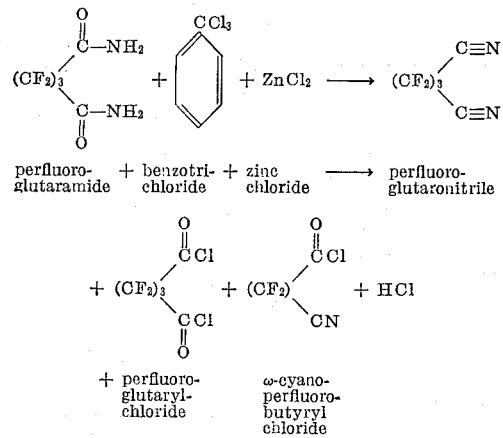

Instead of zinc chloride, suitable proportions, e.g., 0.2–5 percent by weight of the reactants of other Lewis acid catalysts such as aluminum and ferric chlorides and other known Lewis acid metallic chlorides may be substituted for the zinc chloride with similar good results.

Example 2 illustrates another dehydration method of this invention.

Example 2

Into a one liter, three-necked flask were placed 400 milliliters of trichlorobenzene and 244 grams (1.25 moles) benzotrichloride and 4 grams ZnCl₂. The flask was fitted with a mechanical stirrer, Vigreux column with distilling head, thermometer and dripping funnel. The solvent and benzotrichloride were heated to 170 degrees centigrade and the slow addition of a trichlorobenzene slurry of 100 grams (0.42 mole) of perfluoroglutaramide started. The addition took 2.5 hours. The exit gases were cooled by a spiral condenser off the distilling head and cooled in a wet ice trap followed by a series of Dry-Ice traps. The perfluoroglutaronitrile was collected in the Dry-Ice traps. After addition of all the amide the temperature was raised to 195 degrees centigrade, and a fraction collected which boiled at 110 degrees centigrade. After distillation of the products there were obtained 35 grams of perfluoroglutaronitrile (41.3 percent) and 27 grams of perfluoroglutaryl chloride, boiling point 110 degrees centigrade (23.1 percent). Instead of benzotrichloride, xylene hexachloride may be used with similar results. This is also the case when perfluorosuccinamide and perfluoroadipamide are the starting materials.

The perfluorinated nitriles are important intermediates in the preparation of perfluorinated diamidine elastomers as well as other useful plastics. Copolymers of perfluorinated diamidines and monoamidines give thermally stable fluids and elastomeric materials. Similarly, the ω-cyanoperfluoroalkanoyl chlorides of the present invention are useful intermediates in the preparation of perfluoroalkylenetriazine polymers, such as those disclosed in copending application Ser. No 533,430, filed Mar. 11, 1966. These polymers are thermally stable and resistant to some solvents, while being soluble in other solvents, such as alkyl acetates, alkyl perfluoroalkanoates, and fluorinated solvents, such as fluorinated xylenes and fluorine-containing triazines.

One of the problems in preparing perfluorinated nitriles, such as perfluoroglutaronitrile, is that, with most dehydrating agents, the perfluorinated amides cyclize on dehydration, giving greater yields of the cyclic imides such as perfluoroglutarimide than of the dinitriles. Also, by-products, including ω-cyano perfluoro butyryl chloride and perfluoroglutarylchloride, are obtained unless the mole ratio of the dehydrating agent to the starting amide is carefully controlled.

A clearer understanding of these problems will be evident after a consideration of the following table, in which are described the reagents employed and products obtained when following procedures like those of Examples 1 and 2.

Example 10 indicates the total unsuitability for use of several dehydrating agents, typified by benzoyl chloride. Although benzoyl chloride itself is not suitable, it is made as a by-product in the present process from benzotrichloride. Thus, it is present and is available as a useful product of the reaction and does not prevent the production of the dinitrile in the present processes. Other reagents which were tested and found unsatisfactory for use are thionyl chloride, phosphorus oxychloride, phosphorus pentachloride and acetic anhydride.

The dehydration reactions are best carried out in the presence of metallic chloride catalysts. Typical of such catalysts which may be used are the halides of zinc, aluminum, iron, boron and tin, such as zinc chloride, aluminum chloride, ferric chloride, stannic chloride and boron trifluoride.

The reaction temperatures employed will generally be between about one hundred and sixty degrees centigrade and two hundred and ten degress centigrade and will preferably be between one hundred and ninety degrees centigrade and two hundred and ten degrees centigrade when using benzotrichloride. When using xylene hexachloride, the reaction temperature employed will generally be between about one hundred and sixty degrees centigrade and two hundred and fifty degrees centigrade and preferably between about one hundred and ninety degrees centigrade and two hundred and ten degrees centigrade. The reaction may be carried out in the presence or absence of inert solvents, such as dichlorobenzene or trichlorobenzene.

Molar ratios of benzotrichloride to the starting amide may be varied considerably. However, in order to suppress formation of by-products, mole ratios greater than 3:1 are required, even when utilizing recycle to raise the yields of dinitriles.

Although ratios of 4:1 to 20:1 may be used, sometimes with recycle, the preferred mole ratios of benzotrichloride to the starting amide are between about 10:1 and about 50:1, to obtain best yields of the dinitrile without much imide or diacid chloride. The molar ratios of xylene hexachloride to the starting amide may also be varied considerably, the molar ratios required being generally one-half those required when using benzotrichloride. This is because of the two trichloromethyl groups in this compound.

As was mentioned previously, yields can be increased

DEHYDRATION OF PERFLUOROGLUTARAMIDE

| Example | Dehydrating reagent | Mole ratio of dehydrating agent to the perfluoroglutaramide | Nitrile yield, percent | Imide yield, percent | Perfluoroglutaryl chloride yield, percent | Total yield, percnet |
|---|---|---|---|---|---|---|
| 3 a | Benzotrichloride | 1:1 | 47.1 | 16.0 | 5.2 | 68.3 |
| 4 | do | 2:1 | 45.0 | 5.0 | 5.0 | 55.0 |
| 5 b | do | 3:1 | 43.4 | | 29.6 | 73.0 |
| 6 b | do | 4:1 | 33.8 | | 33.7 | 67.5 |
| 7 | do | 10:1 | 58.0 | | 3.0 | 61.0 |
| 8 | do | 20:1 | 60.1 | | | 6.1 |
| 9 | Xylene hexachloride | 5:1 | 60.6 | | 3.5 | 64.1 |
| 10 | Benzoyl chloride | 3:1 | | 60.0 | | 60.0 | a The yields of dinitrile are further increased, to over 55% in Example 3, by fractionally separating the imide from the dinitrile and treating it with ammonia to produce the diamide which is mixed with feed diamide and is converted to the dinitrile.
b The yields of dinitrile are further increased, to over 55% in Examples 5 and 6, as well as in Examples 1 and 2, by reacting the diacid chloride with ethanol at normal esterfication temperatures and then converting the diester to the diamide by treatment with ammonia to produce the diamide which is mixed with the feed diamide and is converted to the dinitrile.

It will be apparent from a consideration of the foregoing chart that in Examples 3 and 4, the imide and chloride by-products are both produced; that in Examples 5 and 6, the imide is not obtained, but the yield of chloride becomes much greater and that in Example 7, the chloride yield is low and the nitrile yield is high. Example 9 employing xylene hexachloride, indicates that not as great a molar quantity of this dehydrating agent is required to reach an optimum nitrile yield as with benzotrichloride.

by reacting by-product diacid chloride material with lower alcohols, e.g., of 1 to 4 carbon atoms, to form esters, which are then ammoniated to diamides. Usually about molar equivalent proportions of alcohol and diacid chloride will be reacted and ammonia will be in excess, e.g., 1.1 to 10 molar equivalent ratio. Although the imide may be converted to the amide, too, its separation and reaction are more difficult and such procedure is less preferred.

*Example 11.—ω-Cyanoperfluorobutyryl chloride*

To a mixture of 5865 parts of benzotrichloride, 87.5 parts of zinc chloride heated and stirred at 205–210 degrees centigrade in a flask equipped with a distillation column and with cold traps to collect products are added a slurry of 1190 parts of perfluoroglutaramide in 1460 parts of trichlorobenzene in 4 hours. Hydrogen chloride passed through the column and traps at temperatures of zero degrees centigrade and minus 78 degrees centigrade leaving condensable perfluoroglutaronitrile and higher boiling liquids. The crude products were then fractionated from phosphorus pentoxide through a fractionating column giving 80 parts of ω-cyanobutyryl chloride ($NC(CF_2)_3COCl$) boiling range 74 to 75.5 degrees centigrade. The infrared spectrum was characteristic for nitrile and acid chloride with bands at 2250 and 1800 reciprocal centimeters respectively.

*Analysis.*—Calculated for $C_5ClF_6NO$: C, 25.07; Cl, 14.80; N, 5.85. Found: C, 25.15; H, 0.00; N, 5.58; Cl, 14.40.

*Example 12.—ω-Cyanooctafluorovaleroyl chloride*

In a manner after Example 11, when 1440 parts of perfluoroadipamide are substituted for perfluoroglutaramide, ω-cyanooctafluorovaleroyl chloride will be produced.

*Example 13.—ω-Cyanoperfluorononanoyl chloride*

In a manner after Example 11, when 2440 parts of perfluorosebacamide are substituted for perfluoroglutaramide, ω=cyanoperfluorononanoyl chloride will be produced.

Example 14 shows the preparation of ω-cyanoperfluorononanoyl chloride by a method different from that of Example 11. This method was not discovered by me.

*Example 14.—ω-Cyanoperfluorononanoyl*

Trichloromethyl ω-cyanoperfluorononanoate, (25.1 grams), and ferric chloride, (3 grams) were heated in a distilling apparatus to 140 degrees centigrade in 2 hours, then to 160 degrees centigrade in 1.5 hours. Vacuum (52 millimeters mercury) was then applied and the distillate was collected: Cut 1, 15.6 grams, boiling point 99–102 degrees centigrade, 89.5 percent pure by gas liquid chromatographic analysis. Cut 2, 3.0 grams, boiling point 102–110 degrees centigrade, 92.2 percent pure by gas liquid chromatographic analysis.

*Analysis.*—Calculated for $C_{10}Cl_{16}NO$: C, 24.53; F, 62.10; N, 2.86. Found: C, 24.72; H, 0.00; N, 3.10.

The infrared spectrum, was characteristics for nitrile and acid chloride with bands at 2250 and 1800 reciprocal centimeters, respectively.

Although this invention has been illustrated by citing specific details of given species embraced within the scope of the invention, it is to be understood that various modifications within the invention are possible, some of which have been referred to above.

I claim:

1. ω-Cyanoperfluoroalkanoyl chlorides of the formula

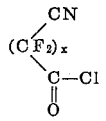

wherein $x$ is from 1 to 12.

2. The compound of claim 1, wherein $x$ is 3.
3. The compound of claim 1, wherein $x$ is 4.
4. The compound of claim 1, wherein $x$ is 8.

References Cited

UNITED STATES PATENTS 3,274,229  9/1966  Verbanic _____ 260—465.2

CHARLES B. PARKER, *Primary Examiner.*

JOSEPH P. BRUST, *Examiner.*